US012725516B2

(12) United States Patent
Ji et al.

(10) Patent No.: US 12,725,516 B2
(45) Date of Patent: Sep. 1, 2026

(54) APPARATUS AND METHOD FOR CONTROLLING TRAFFIC LIGHTS

(71) Applicant: ELECTRONICS AND TELECOMMUNICATIONS RESEARCH INSTITUTE, Daejeon (KR)

(72) Inventors: Myungin Ji, Daejeon (KR); Jinwoo Kim, Daejeon (KR); Kyoung-Wook Min, Daejeon (KR); Kyoung Hwan An, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 53 days.

(21) Appl. No.: 18/935,779

(22) Filed: Nov. 4, 2024

(65) Prior Publication Data

US 2025/0157329 A1 May 15, 2025

(30) Foreign Application Priority Data

Nov. 9, 2023 (KR) ........................ 10-2023-0154406
Oct. 22, 2024 (KR) ........................ 10-2024-0144680

(51) Int. Cl.
*G08G 1/07* (2006.01)

(52) U.S. Cl.
CPC ..................................... *G08G 1/07* (2013.01)

(58) Field of Classification Search
CPC ........... G08G 1/07; G08G 1/095; G08G 1/096
See application file for complete search history.

(56) References Cited

U.S. PATENT DOCUMENTS

2007/0176791 A1* 8/2007 Bolotin .................. G08G 1/096 340/929
2012/0146814 A1 6/2012 Kim
2014/0136090 A1 5/2014 Yun et al.
2022/0189300 A1* 6/2022 Yu .......................... B60K 35/28
2023/0069211 A1* 3/2023 Kamakura ....... G08G 1/096783

FOREIGN PATENT DOCUMENTS

KR 10-1303651 B1 9/2013
KR 10-2267038 B1 6/2021

* cited by examiner

*Primary Examiner* — An T Nguyen
(74) *Attorney, Agent, or Firm* — LRK PATENT LAW FIRM

(57) ABSTRACT

Disclosed are an apparatus and method for controlling traffic lights, and more particularly, an apparatus and method for controlling traffic lights, which can provide information on the remaining time of a traffic signal. The apparatus for controlling traffic lights includes a traffic signal display controller configured to transmit a pattern control command including information related to the remaining time of a current traffic signal and traffic lights configured to display information on a traffic signal by receiving the pattern control command.

15 Claims, 11 Drawing Sheets

APPARATUS AND METHOD FOR CONTROLLING TRAFFIC LIGHTS

CROSS-REFERENCE TO RELATED APPLICATION(S)

This application claims priority to and the benefit under 35 USC § 119 of Korean Patent Application ’No. 10-2023-0154406 filed on Nov. 9, 2023, and ’No. 10-2024-0144680 filed on Oct. 22, 2024, in the Korean Intellectual Property Office, the entire disclosures of which are incorporated herein by reference for all purposes.

BACKGROUND

1. Technical Field

The present disclosure relates to an apparatus and method for controlling traffic lights, and more particularly, to an apparatus and method for controlling traffic lights, which can provide information on the remaining time of a traffic signal.

The apparatus and method for controlling traffic lights according to an embodiment of the present invention can be particularly useful to controlling a traffic signal for which remaining time information is not displayed for a vehicle signal.

2. Description of Related Art

According to a conventional technology, traffic lights that provide notification of the remaining time of a green crossing signal at a crosswalk have been applied. Recently, traffic lights that provide notification of the remaining waiting time for a red signal.

In contrast, traffic lights for a vehicle do not provide information on the remaining time of a traffic signal. In some trial sections, real-time traffic lights information may be received through cooperative-intelligent transport systems (C-ITS) or vehicle-to-infrastructure (V2I) communication, but there is a difficulty in the use of the real-time traffic lights information because infrastructure needs to be installed.

SUMMARY

Various embodiments are directed to providing an apparatus and method for controlling traffic lights, which can recognize a display signal of traffic lights through a camera installed in a vehicle and can identify the remaining time up to a change of the signal by adding a turn-on/off pattern or an LED turn-on pattern within traffic lights, which has a fast cycle that cannot be recognized by a person, to the traffic lights.

An apparatus for controlling traffic lights according to an embodiment of the present disclosure includes a traffic signal display controller configured to transmit a pattern control command including information related to the remaining time of a current traffic signal and traffic lights configured to display information on a traffic signal by receiving the pattern control command.

The traffic signal display controller transmits the pattern control command for a cycle related to the turn-on and turn-off of an LED device corresponding to a specific signal based on the remaining time.

The traffic signal display controller controls the LED device to display information on the remaining time by adjusting the cycle related to the turn-on and turn-off of the LED device that flickers within a preset time interval.

The traffic signal display controller transmits the pattern control command for the cycle related to the turn-on and turn-off of the LED device by considering the results of the grouping of the remaining times.

The traffic signal display controller transmits the pattern control command for an order in which an LED device corresponding to a specific signal is turned on based on the remaining time.

The traffic signal display controller controls the LED device to display information on the remaining time by adjusting a time interval for an order in which the LED device is turned on.

The traffic signal display controller controls the LED device to display information on the remaining time by differently adjusting a shape according to an order in which the LED device is turned on.

A traffic control method based on control of traffic lights according to an embodiment of the present disclosure includes steps of (a) displaying a pattern including information related to a remaining display time for a current traffic signal of traffic lights, (b) identifying the remaining display time by recognizing the displayed pattern, and (c) determining a driving behavior based on results of the identification of the remaining display time.

The step (a) includes displaying the pattern so that the turn-on and turn-off of the traffic lights are repeated in a cycle that is not recognized by a naked eye of a person based on the remaining display time.

The step (a) includes displaying the pattern by differently adjusting a flickering cycle of the traffic lights within a preset time interval.

The step (a) includes displaying the pattern in a preset flickering cycle based on a group including the remaining display time.

The step (a) includes displaying the pattern by adjusting an order in which a plurality of LED devices corresponding to the current traffic signal is turned on.

The step (a) includes displaying the pattern by adjusting a time interval at which the plurality of LED devices is turned on.

The step (a) includes displaying the pattern in a shape according to a time flow that appears as the plurality of LED devices is turned on.

The step (b) includes photographing a traffic light area by using a camera mounted on a vehicle or a mobile terminal within the vehicle and recognizing the pattern.

The step (c) includes issuing decision making on whether to pass through an intersection.

A system for controlling traffic lights according to an embodiment of the present disclosure includes an input interface device configured to receive a control command related to a signal display of traffic lights, memory in which a program that controls a light emission of an LED device in response to a control command is stored, and a processor configured to execute the program. The processor controls the light emission of the LED device in response to the control command, but controls the light emission of the LED device based on a pattern including information on a remaining time of a current traffic signal.

The processor controls a flickering cycle of the LED device disposed in a traffic light area corresponding to a specific signal.

The processor controls an order in which the LED device disposed in the traffic light area corresponding to the specific signal is turned on based on a preset order.

According to the embodiments of the present disclosure, by providing information on the remaining time of a current traffic signal before a change of a traffic signal through traffic lights, it is possible to reduce social costs according to a dilemma zone (i.e., a zone in which a driver cannot physically stop his or her vehicle right before a stop line although the driver attempts to stop the vehicle and thus inevitably violates a traffic signal because the vehicle does not exit from an intersection even after the traffic signal changes into a red signal if the vehicle continues to drive at timing at which the traffic signal changes from a green signal to a yellow signal).

According to the embodiments of the present disclosure, it is possible to greatly reduce frequency of congestion or accidents by solving a problem related to the dilemma zone that increases traffic congestion at an intersection or that becomes a cause of a traffic accident.

According to the embodiments of the present disclosure, it is possible to reduce a traffic congestion situation in which a traffic signal changes when a vehicle does not pass through an intersection due to previous congestion although the vehicle enters the intersection after recognizing a green signal at the intersection. It is possible to determine whether a vehicle passes through an intersection when the vehicle enters the intersection by calculating information on a current congestion state of a corresponding road and the remaining time of a traffic signal in combination.

According to the embodiments of the present disclosure, it is possible to prevent a reduction of riding quality attributable to the sudden deceleration of a vehicle because a traffic signal changes right before the vehicle enters an intersection.

Effects of the present disclosure which may be obtained in the present disclosure are not limited to the aforementioned effects, and other effects not described above may be evidently understood by a person having ordinary knowledge in the art to which the present disclosure pertains from the following description.

DETAILED DESCRIPTION

Figure 1:
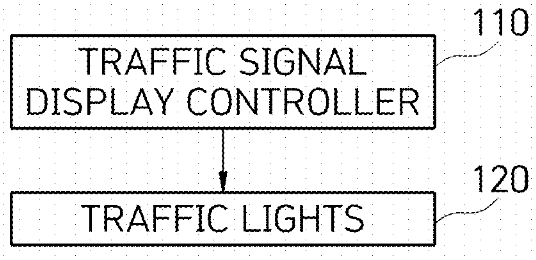
FIG. 1 illustrates an apparatus for controlling traffic lights according to an embodiment of the present disclosure.

The aforementioned object, other objects, advantages, and characteristics of the present disclosure and a method for achieving the objects, advantages, and characteristics will become clear with reference to embodiments to be described in detail along with the accompanying drawings.

However, the present disclosure is not limited to embodiments disclosed hereinafter, but may be implemented in various different forms. The following embodiments are merely provided to easily notify a person having ordinary knowledge in the art to which the present disclosure pertains of the objects, constructions, and effects of the present disclosure. The scope of rights of the present disclosure is defined by the writing of the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other components, steps, operations and/or components in addition to mentioned components, steps, operations and/or components.

Hereinafter, in order to help understanding of those skilled in the art, a proposed background of the present disclosure is described and embodiments of the present disclosure are then described.

Traffic lights that provide notification of the remaining crossing time for a green signal at a crosswalk have become traffic lights having a familiar form through a trial service in October 2005. It is possible to prevent a case in which a pedestrian attempts to cross recklessly when a pedestrian signal flickers, thereby reducing a risk of a traffic accident.

Traffic lights that display the remaining time of a red signal, which provide even the remaining waiting time for a red signal in addition to the existing remaining crossing time for a green signal was installed as a trial in Seoul in December 2023. Accordingly, it is expected that effects in which a pedestrian's frustration of waiting traffic lights at a crosswalk is solved and a pedestrian's jaywalking is prevented will be increased. In order to prevent a situation in which a pedestrian hurriedly starts crossing in advance, the remaining time of a red signal is not displayed when the remaining time until the red signal ends is below a certain threshold.

In contrast, traffic lights for a vehicle do not provide information on the remaining time of a traffic signal. In some trial sections, real-time traffic lights information may be received through cooperative-intelligent transport systems (C-ITS) or vehicle-to-infrastructure (V2I) communication. However, there is a difficulty in the use of the real-time traffic lights information because the installation of infrastructure, interlocking with infrastructure, and the installation of a receiver and an interlocking device for a vehicle need to be predetermined.

Embodiments of the present disclosure have been proposed to solve the aforementioned problems, and propose a technique capable of displaying the turn-on/off pattern of an LED device having a fast cycle to the extent that a person cannot recognize the turn-on/off pattern by adding the turn-on/off pattern to the existing traffic lights based on the remaining time up to a change of a traffic signal and identifying the remaining time of a traffic signal by recognizing the turn-on/off pattern through a high-speed camera installed in a vehicle.

The turn-on and turn-off of current LED traffic lights are repeated 15 to 60 times per second. According to an embodiment of the present disclosure, it is possible to display the turn-on and turn-off time cycles of traffic lights and a turn-off pattern of traffic lights by adjusting the turn-on and turn-off time cycles and the turn-off pattern based on the remaining time of a traffic signal. It is possible for a high-speed camera installed in an autonomous vehicle to check information on the remaining time by analyzing the turn-on and turn-off time cycles and the turn-off pattern.

An apparatus and method for controlling traffic lights according to an embodiment of the present disclosure may be used in determining whether a vehicle has to enter/pass through an intersection because the vehicle that recognizes the time when a traffic signal is changed can calculate the speed at the vehicle is required to pass through an intersection.

A flicker phenomenon is a phenomenon in which the brightness of a ray or illumination is suddenly changed, and occurs due to a change of a light source itself or an external cause, such as a wave of a power voltage. In Korea, 120 times (i.e., 60 times of turn-on and 60 times of turn-off) of flickering occur per second in an illumination device in which a current device, such as a flicker-free device, is not used because a power frequency is 60 Hz.

The flicker phenomenon is not recognized by a human's eyeball that cannot distinguish frames of 24 Hz or more. In contrast, a camera mounted on a vehicle or a camera mounted on an intelligent terminal, such as a smartphone, can recognize the flicker phenomenon because the camera supports the capturing of an image of a maximum of 960 fps.

An embodiment of the present disclosure has a technical characteristic in that the flicker phenomenon is solved and information on the remaining time of a traffic signal is displayed in the form of a pattern by using an LED illumination device capable of adjusting turn-on and turn-off cycles.

FIG. 1 illustrates an apparatus for controlling traffic lights according to an embodiment of the present disclosure.

The apparatus for controlling traffic lights according to an embodiment of the present disclosure includes a traffic signal display controller 110 that transmits a flickering pattern control command including information on the remaining time of a current traffic signal and traffic lights 120 that displays information on a traffic signal by receiving a flickering pattern control command.

The traffic signal display controller 110 transmits a pattern control command for a cycle related to the turn-on and turn-off of an LED device, which corresponds to a specific signal, based on the remaining time. The traffic signal display controller 110 controls LED devices to display information on the remaining time by adjusting a cycle related to the turn-on and turn-off of the LED devices that flicker within a preset time interval. For example, the traffic signal display controller 110 transmits a pattern control command that enables turn-on and turn-off to be repeated at intervals of 1 tick between a $0^{th}$ second and a $1^{st}$ second after a green signal is turned on and that enables the turn-on and the turn-off to be repeated for one second. Furthermore, the traffic signal display controller 110 transmits a pattern control command that enables turn-on to be repeated for 3 ticks and turn-off to be repeated for 1 tick between a $15^{th}$ second and a $16^{th}$ second and that enables turn-on to be repeated for 2 ticks and turn-off to be repeated for 1 tick between the $16^{th}$ second and a $17^{th}$ second.

The traffic signal display controller 110 transmits a pattern control command for a cycle related to the turn-on and turn-off of an LED device by considering the resulting of the grouping of the remaining times. For example, the traffic signal display controller 110 controls LED devices to be repeatedly turned on for 3 ticks and to be repeatedly turned off for 1 tick between a $0^{th}$ second and a $10^{th}$ second after timing at which a green signal is turned on, then controls the LED devices to be repeatedly turned on for 2 ticks and to be repeatedly turned off between the $10^{th}$ second to a $15^{th}$ second, and then controls the LED devices to be repeatedly turned on for 1 tick and turned off for 1 thick between the $15^{th}$ second and a $20^{th}$ second.

The traffic signal display controller 110 transmits a pattern control command for an order in which an LED device corresponding to a specific signal is turned on based on the remaining time. For example, the traffic signal display controller 110 transmits a pattern control command that enables LED devices to be sequentially turned on from an LED device at the edge of traffic lights toward the central part of the traffic lights in a helical form, transmits a pattern control command that enables a group of LED devices disposed at different radii of traffic lights to be turned on from LED devices at the edge of the traffic lights toward the central part of the traffic lights, or transmits a pattern control command that enables a group of LED devices disposed at different radii of traffic lights to be turned on from the central part of the traffic lights toward LED devices at the edge of the traffic lights.

The traffic signal display controller 110 controls LED devices to display information on the remaining time by adjusting a time interval of an order in which the LED devices are turned. That is, the traffic signal display controller 110 transmits a pattern control command so that LED devices follow any one of the methods (i.e., transmits a pattern control command that enables LED devices to be sequentially turned on from an LED device at the edge of traffic lights toward the central part of the traffic lights in a helical form, transmits a pattern control command that enables a group of LED devices disposed at different radii of traffic lights to be turned on from LED devices at the edge of the traffic lights toward the central part of the traffic lights, or transmits a pattern control command that enables a group of LED devices disposed at different radii of traffic lights to be turned on from the central part of the traffic lights toward LED devices at the edge of the traffic lights), but may differently display information on the remaining time of a current traffic signal by differently adjusting the intervals of the time when LED devices are sequentially turned on.

The traffic signal display controller 110 controls LED devices to display information on the remaining time by differently adjusting a shape according to an order in which the LED devices are turned on. That is, for example, the traffic signal display controller 110 may transmit a pattern control command that enables LED devices to be sequentially turned on from an LED device at the edge of traffic lights toward the central part of the traffic lights in a helical form between a $0^{th}$ second and a $10^{th}$ second from timing at which a green signal has been turned on, may transmit a pattern control command that enables a group of LED devices disposed at different radii of traffic lights to be turned on from LED devices at the edge of the traffic lights toward the central part of the traffic lights between the $10^{th}$ second and a $15^{th}$ second, and may transmit a pattern control command that enables a group of LED devices disposed at different radii of traffic lights to be turned on from the central part of the traffic lights toward LED devices at the edge of the traffic lights between the $15^{th}$ second and a $20^{th}$ second.

Figure 2:
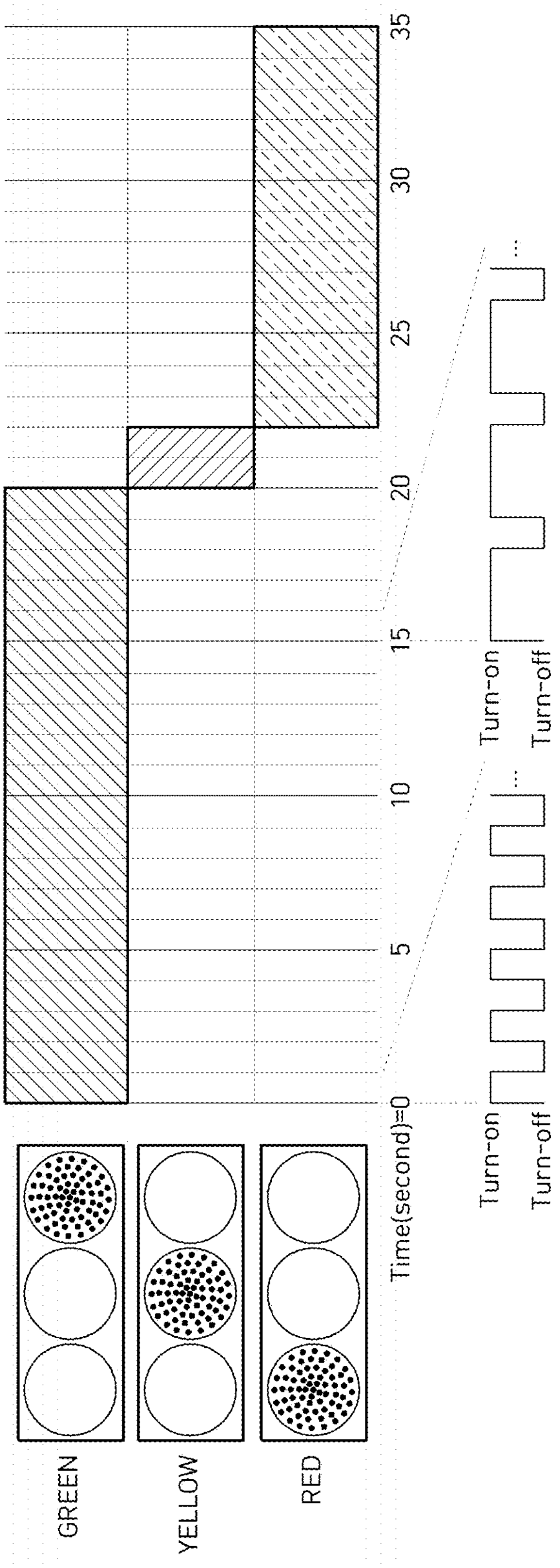
FIG. 2 is a diagram illustrating a flickering cycle for providing information on the remaining time for traffic lights according to an embodiment of the present disclosure.

FIG. 2 is a diagram illustrating a flickering cycle for providing information on the remaining time for traffic lights according to an embodiment of the present disclosure.

Referring to FIG. 2, a green signal of traffic lights is turned on at a $0^{th}$ seconds. The state of the green signal is changed into a turn-off state at a $20^{th}$ second, and simultaneously a yellow signal is turned on. At a $22^{nd}$ second, the yellow signal is turned, and simultaneously a red signal is turned on.

In common traffic lights, the turn-on and turn-off of traffic lights are periodically repeated due to a flicker phenomenon as expanded at the $0^{th}$ second.

According to an embodiment of the present disclosure, the approaching of a change in the traffic signal is notified by controlling a traffic light flickering pattern due to an aperiodic turn-on and turn-off phenomenon at the $15^{th}$ second.

That is, a traffic light flickering pattern is recognized by using a camera mounted on a vehicle or a camera mounted on a smart device although the traffic light flickering pattern cannot be detected by a human's eye. A corresponding vehicle uses the traffic light flickering pattern to issue decision making for the entry/passage of an intersection by calculating a driving speed that is necessary when the vehicle passes through the intersection based on the results of the recognition of the traffic light flickering pattern.

Figure 3:
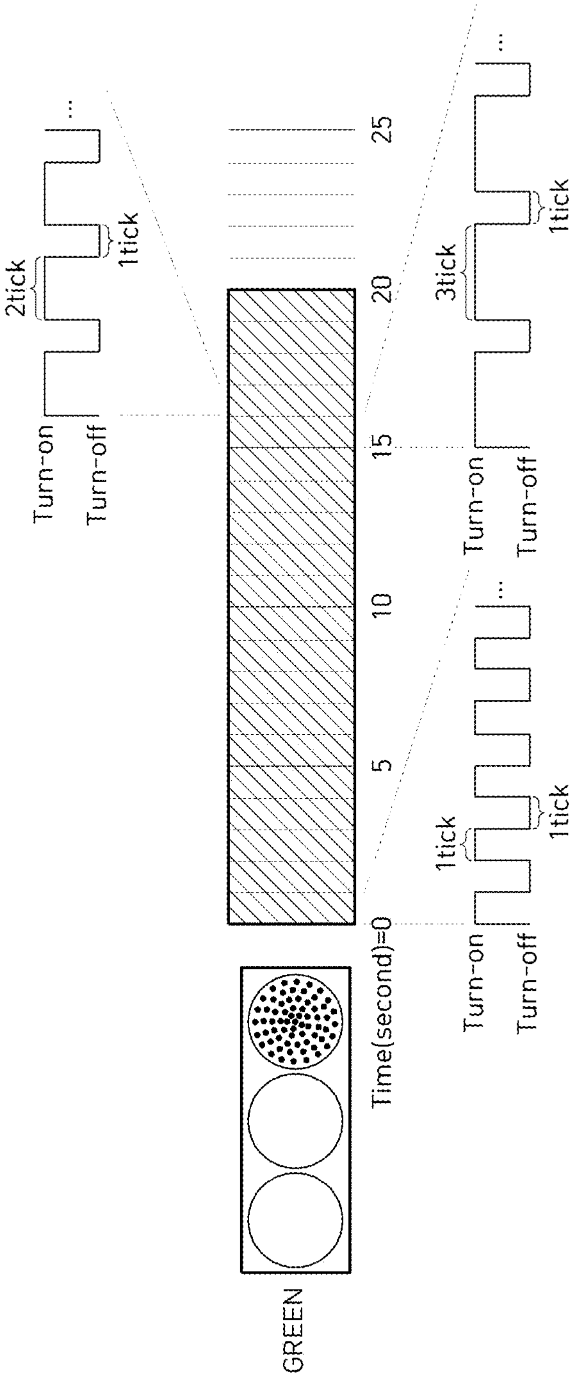
FIG. 3 illustrates the adjustment of the turn-on/turn-off cycle of a traffic signal according to the remaining time of the traffic signal according to an embodiment of the present disclosure.

FIG. 3 illustrates the adjustment of the turn-on/turn-off cycle of a traffic signal according to the remaining time of the traffic signal according to an embodiment of the present disclosure.

According to an embodiment of the present disclosure, in all of time intervals or a situation having a specific time or less, a cycle is different in each second.

Referring to FIG. 3, after a green signal is turned on, the green signal is repeatedly turned on and off at intervals of 1 tick between a $0^{th}$ second and a $1^{st}$ second, and the turn-on and the turn-off are repeated for one second.

Such an interval is different for each remaining time of a traffic signal. For example, the turn-on of a traffic signal is repeated for 3 ticks and the turn-off of a traffic signal is repeated for 1 tick between a $15^{th}$ second and a $16^{th}$ second. The turn-on of the traffic signal is repeated for 2 ticks and the turn-off of the traffic signal is repeated for 1 tick between the $16^{th}$ second and a $17^{th}$ second.

The green signal has been described in an embodiment of the present disclosure, but the repetition of turn-on and turn-off may be identically applied to a yellow signal, a red signal, and a green arrow signal. An accurate time for 1 tick and a turn-on/turn-off cycle to be applied for each second may be determined through country standardization.

Figure 4:
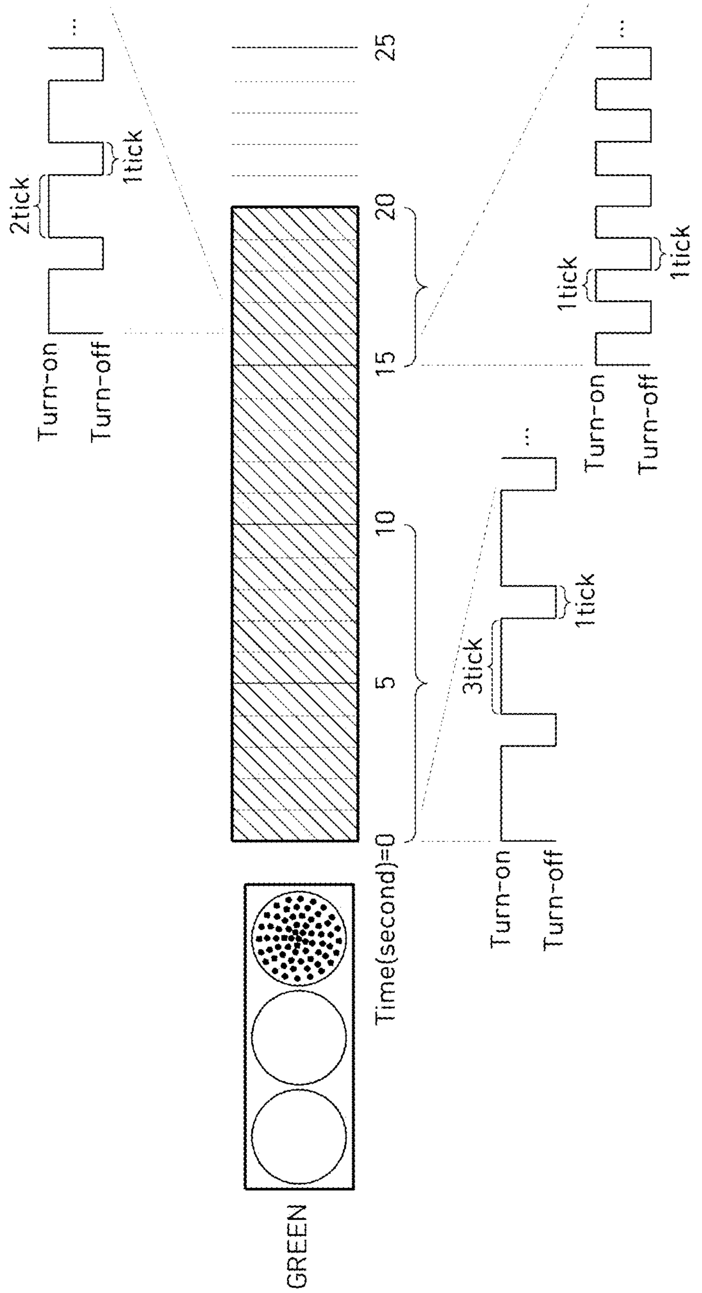
FIG. 4 illustrates the adjustment of the turn-on/turn-off cycle of a traffic signal according to the remaining time of the traffic signal according to another embodiment of the present disclosure.

FIG. 4 illustrates the adjustment of the turn-on/turn-off cycle of a traffic signal according to the remaining time of the traffic signal according to another embodiment of the present disclosure.

According to another embodiment of the present disclosure, a time interval of one second or more may be grouped depending on how long the remaining time of a traffic signal is left, and a cycle may be different for each group.

Referring to FIG. 4, a green signal is controlled to be repeatedly turned on for 3 ticks and repeatedly turned off for 1 tick between a $0^{th}$ second and a $10^{th}$ second, then to be repeatedly turned on for 2 ticks and repeatedly turned off for 1 tick between the $10^{th}$ second and a $15^{th}$ second, and then to be repeatedly turned on for 1 tick and to be repeatedly turned off for 1 tick between the $15^{th}$ second and a $20^{th}$ second.

The green signal has been described in another embodiment of the present disclosure, but the repetition of turn-on and turn-off may be identically applied to a yellow signal, a red signal, and a green arrow signal. An accurate time for 1 tick and a turn-on/turn-off cycle to be applied for each second may be determined through country standardization.

Figure 5A:
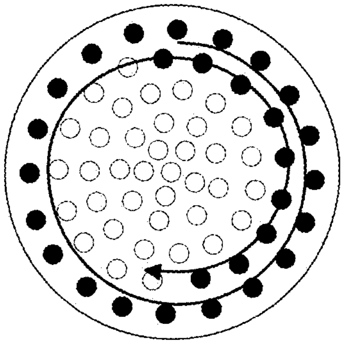
FIGS. 5A to 5C illustrate the turn-on pattern of LED devices for a green signal within traffic lights according to still another embodiment of the present disclosure.
Figure 5B:
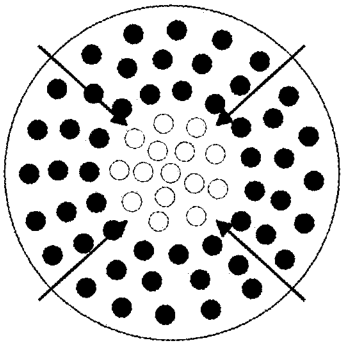
Figure 5C:
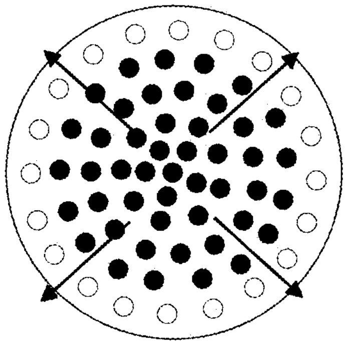

FIGS. 5A to 5C illustrate the turn-on pattern of LED devices for a green signal within traffic lights according to still another embodiment of the present disclosure.

Referring to FIGS. 5A to 5C, there is provided information on the remaining time of a traffic signal by differently controlling the turn-on pattern of LED devices instead of a method of turning on all of LED devices simultaneously.

Referring to FIG. 5A, LED devices are sequentially turned on from an LED device at the edge of traffic lights toward the central part of the traffic lights in a helical form.

Referring to FIG. 5B, a group of LED devices disposed at different radii of traffic lights are turned on from LED devices at the edge of the traffic lights toward the central part of the traffic lights.

Referring to FIG. 5C, a group of LED devices disposed at different radii of traffic lights are turned on from the central part of the traffic lights toward LED devices at the edge of the traffic lights.

The turn-on and turn-off pattern may be combined with the method of adjusting a cycle illustrated in FIGS. 3 and 4, and may be differently applied to for each second or for each time interval group.

The green signal has been described in still another embodiment of the present disclosure, but the repetition of turn-on and turn-off may be identically applied to a yellow signal, a red signal, and a green arrow signal. A shape of a turn-on and turn-off pattern is determined through country standardization.

Figure 6:
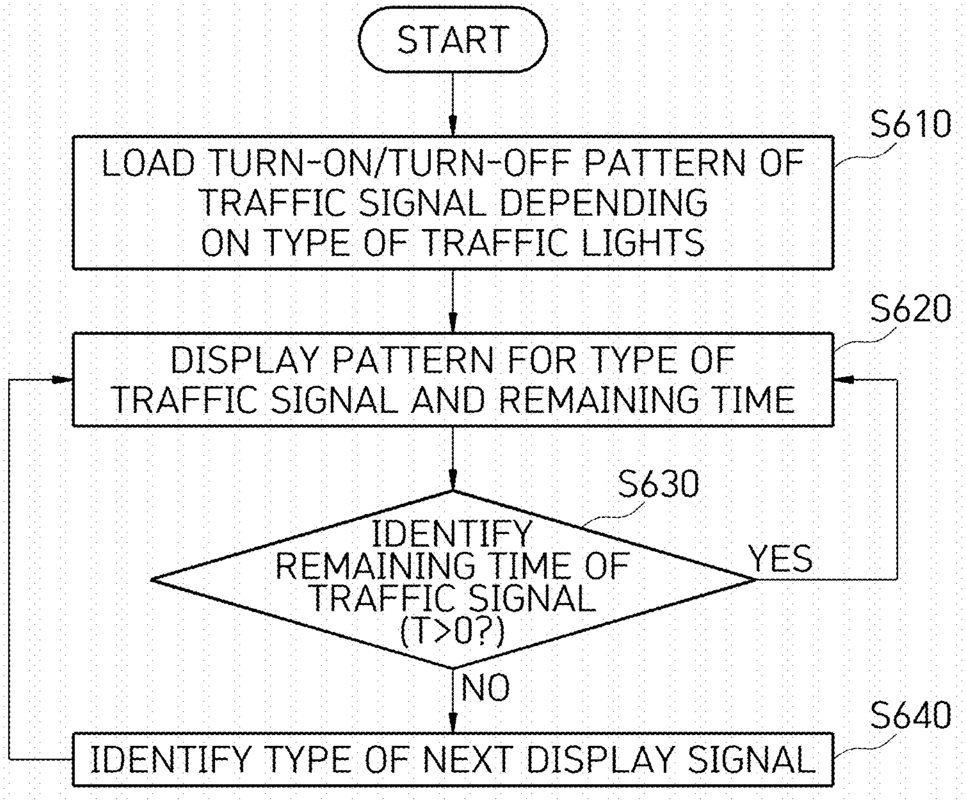
FIG. 6 illustrates a method of controlling traffic lights according to an embodiment of the present disclosure.

FIG. 6 illustrates a method of controlling traffic lights according to an embodiment of the present disclosure.

The turn-on/turn-off pattern of a traffic signal that has been previously stored is loaded onto traffic lights depending on the type of traffic lights (S610). The type of traffic lights includes three-bulb traffic lights and four-bulb traffic lights.

The traffic lights display a pattern for the type of a traffic signal and the remaining time of the traffic signal (S620). A camera mounted on a vehicle or a camera mounted on a smart device identifies information on the remaining time of the traffic signal by recognizing the pattern.

The traffic lights identify whether the remaining time of the traffic signal is left (S630). If the remaining time is not left, the traffic lights identify the type of traffic signal next to a current traffic signal and display a pattern for the type of next traffic signal and the remaining time of the next traffic signal (S640).

According to still another embodiment of the present disclosure, it is possible to modify a pattern control command by monitoring traffic conditions within an intersection. For example, it is assumed that it is necessary to induce a vehicle to not enter an intersection because a tail-biting situation in the intersection. In this case, the traffic signal display controller 110 displays that a corresponding traffic signal (e.g., a green signal) will be changed within a time earlier than an actual remaining time (e.g., a $10^{th}$ second) by modifying a pattern control command. That is, referring to FIG. 4, according to the preset method, the green signal is controlled to be repeatedly turned on for 2 ticks and to be repeatedly turned off for 1 tick between the $10^{th}$ second and the 15$^{th}$ second and then to be repeatedly turned on for 1 tick and to be repeatedly turned off for 1 tick between the 10$^{th}$ second and the 20$^{th}$ second. In order to prevent a tail-biting situation at an intersection, the green signal is actually controlled to be repeatedly turned on for 1 tick and to be repeatedly turned off for 1 tick in the situation of a 13$^{th}$ seconds. Accordingly, a vehicle that is about to enter the intersection is induced to expect that the green signal will be soon terminated so that the vehicle does not enter the intersection.

According to still another embodiment of the present disclosure, when it is determined that the danger of an accident is a preset danger degree or more by monitoring traffic conditions within an intersection or when it is determined that an urgent vehicle nearby needs to preferentially pass through an intersection, a new pattern instead of a preset pattern is controlled to be displayed in an interrupt mode. For example, referring to FIG. 4, in a situation in which the green signal is turned on and is at the 10$^{th}$ second and the green signal is repeatedly turned on for 2 ticks and repeatedly turned off for 1 tick, when it is determined that a vehicle that violates a traffic signal does an illegal U-turn on the opposite side and thus it is expected that the vehicle will collide against a vehicle that travels in response to the green signal, the turn-on and turn-off of the green signal are controlled to be changed so that the green signal is repeatedly turned on for 1 tick and repeatedly turned off for 1 tick in order to prevent the collision against the vehicle that does the illegal U-turn by inducing the vehicle that travels in response to the green signal to not enter an intersection. Furthermore, referring to FIG. 4, in a situation in which the green signal is turned on and is at the 10$^{th}$ second and the green signal is repeatedly turned on for 2 ticks and repeatedly turned on for 1 tick, when it is recognized that an urgent vehicle (e.g., an ambulance) approaches an intersection, the turn-on and turn-off of the green signal are controlled to be changed so that the green signal is repeatedly turned on for 1 tick and repeatedly turned off for 1 tick. Accordingly, it is possible to induce a vehicle other than an urgent vehicle to not enter an intersection.

Figure 7:
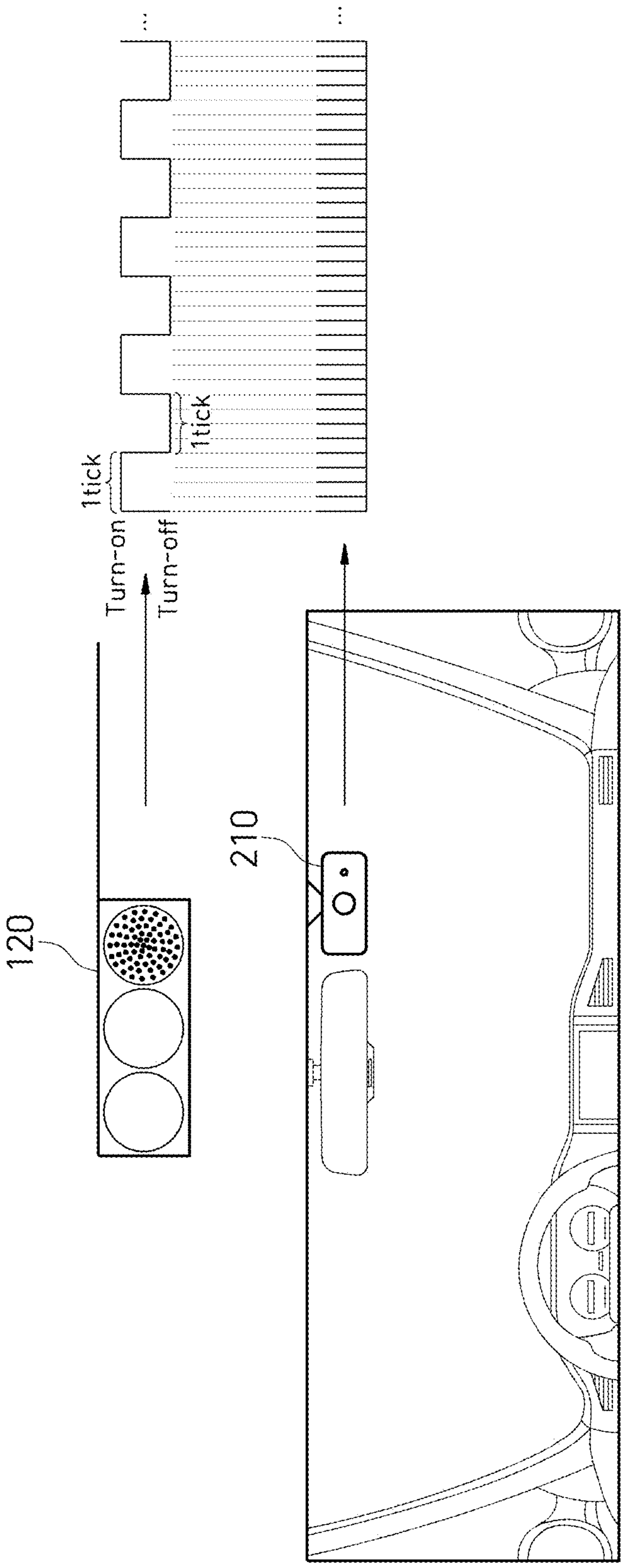
FIG. 7 illustrates a process of recognizing information on a traffic signal the remaining signal change time of which is displayed by using an image sensor installed in a vehicle according to an embodiment of the present disclosure.

FIG. 7 illustrates a process of recognizing information on a traffic signal the remaining signal change time of which is displayed by using an image sensor installed in a vehicle according to an embodiment of the present disclosure.

Referring to FIG. 7, traffic lights 120 display a green signal, and display the turn-on/turn-off pattern of the green signal as described above.

An image sensor 210 installed in a vehicle is installed inside or outside the vehicle, and captures an image at a frame speed shorter than a minimum turn-on/turn-off cycle of an LED that is displayed from the traffic lights 120.

The image sensor 210 captures an image at a relatively shorter cycle than 1 tick of the turn-on/turn-off pattern that is displayed through the traffic lights 120, identifies the turn-on/turn-off cycle of the green signal by analyzing the image, recognizes information on the remaining time of the green signal based on the identified turn-on/turn-off cycle, and transmits the results of the recognition to a vehicle controller.

Figure 8:
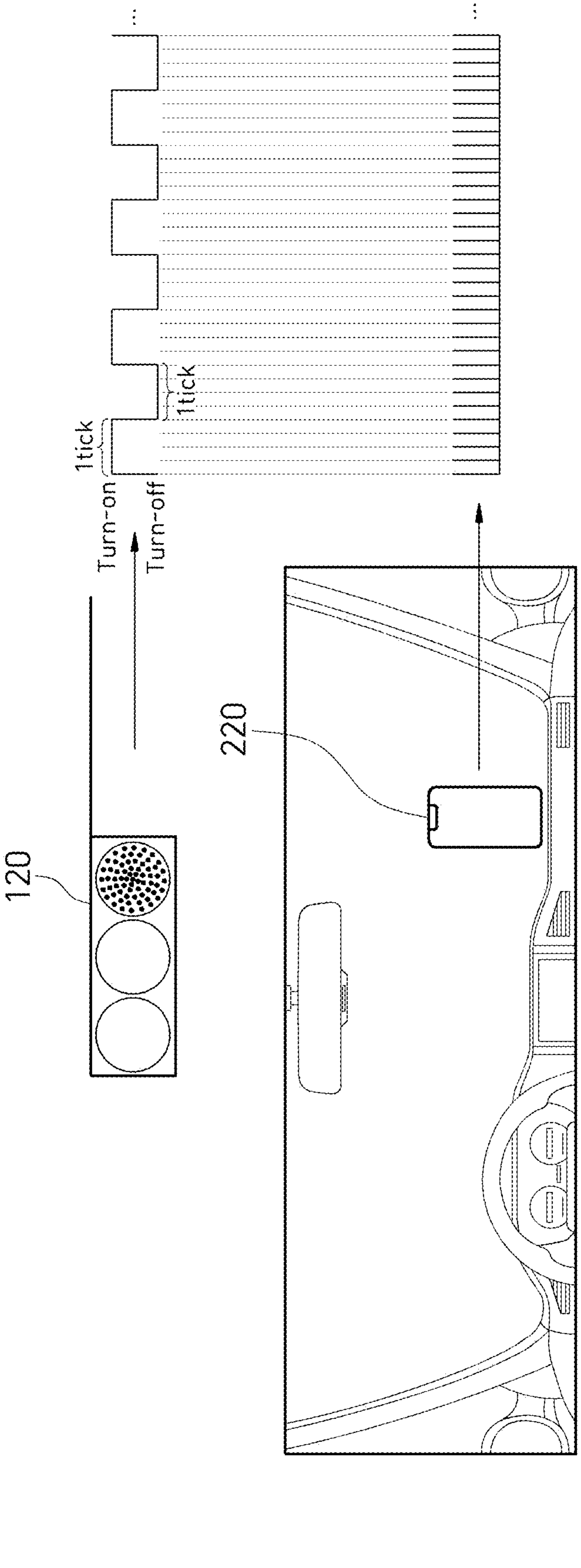
FIG. 8 illustrates a process of recognizing information on a traffic signal the remaining signal change time of which is displayed by using a mobile terminal according to an embodiment of the present disclosure.

FIG. 8 illustrates a process of recognizing information on a traffic signal the remaining signal change time of which is displayed by using a mobile terminal according to an embodiment of the present disclosure.

A mobile terminal 220 includes a camera. An application that processes an image captured by the camera is installed in the mobile terminal 220.

The mobile terminal 220 captures an image at a shorter frame speed than a minimum turn-on/turn-off cycle of an LED that is displayed through the traffic lights 120.

The mobile terminal 220 photographs an image at a relatively shorter cycle than 1 tick of a turn-on/turn-off pattern that is displayed through the traffic lights 120, identifies the turn-on/turn-off cycle of the green signal by analyzing the image, recognizes information on the remaining time of the green signal that is currently displayed based on the identified turn-on/turn-off cycle, and transmits the results of the recognition to a vehicle controller.

Figure 9:
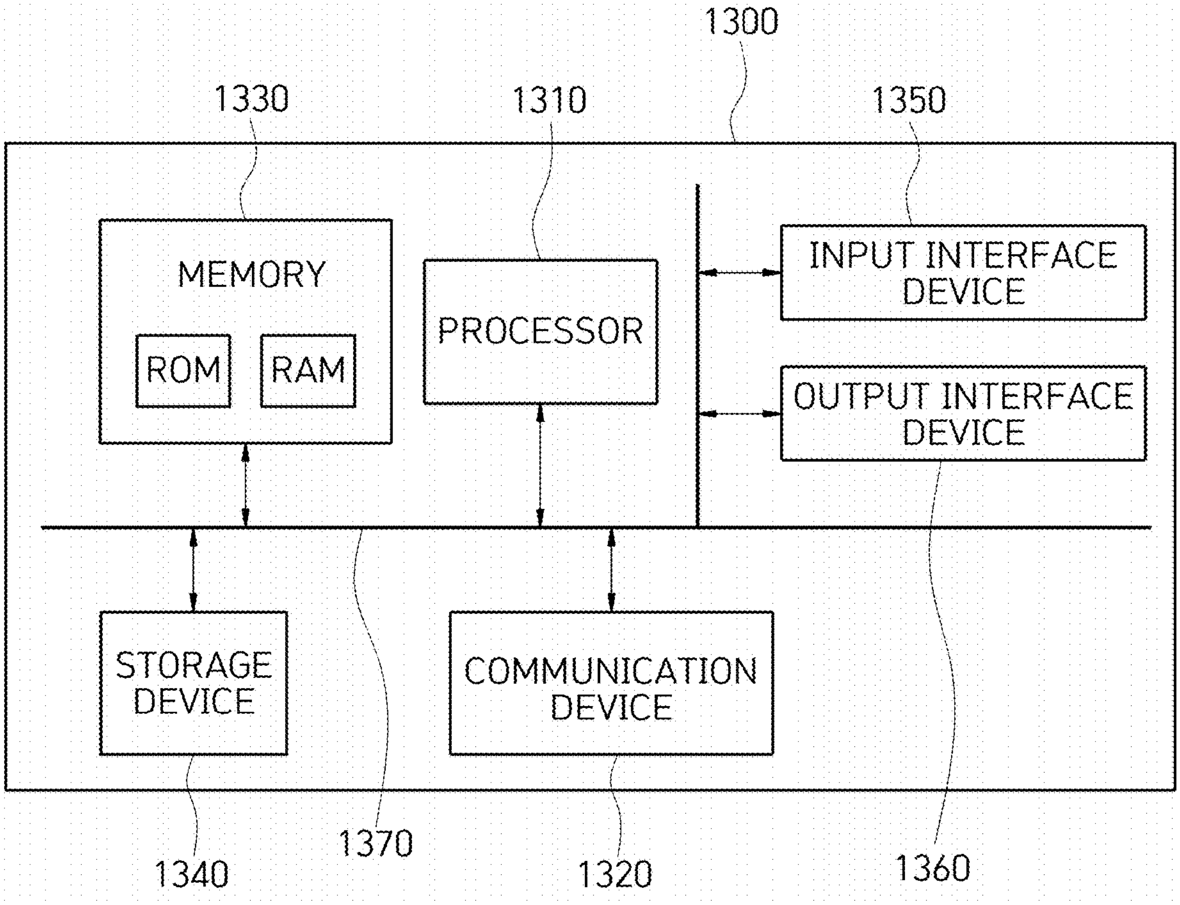
FIG. 9 is a block diagram illustrating a computer system for implementing a method according to an embodiment of the present disclosure.

FIG. 9 is a block diagram illustrating a computer system for implementing a method according to an embodiment of the present disclosure.

Referring to FIG. 9, a computer system 1300 may include at least one of a processor 1310, memory 1330, an input interface device 1350, an output interface device 1360, and a storage device 1340 which communicate with each other through a bus 1370. The computer system 1300 may further include a communication device 1320 that is connected to a network. The processor 1310 may be a central processing unit (CPU) or may be a semiconductor device that executes an instruction that is stored in the memory 1330 or the storage device 1340. The memory 1330 and the storage device 1340 may each include various types of volatile or nonvolatile storage media. For example, the memory may include read only memory (ROM) and random access memory (RAM). In an embodiment of the present specification, the memory may be disposed inside or outside the processor, and may be connected to the processor through various known means. The memory includes various types of volatile or nonvolatile storage media, and may include read-only memory (ROM) or random access memory (RAM), for example.

The system for controlling traffic lights according to an embodiment of the present disclosure includes the input interface device 1350 that receives a control command related to the signal display of traffic lights, the memory 1330 in which a program that controls the light emission of LED devices in response to a control command has been stored, and the processor 1310 that executes the program. The processor 1310 controls the light emission of the LED devices in response to a control command, but controls the light emission of the LED devices based on a pattern including information on the remaining time of a current traffic signal.

The processor 1310 controls the flickering cycle of LED devices disposed in a traffic light area corresponding to a specific signal.

The processor 1310 controls an order in which LED devices disposed in a traffic light area corresponding to a specific signal is turned on based on a preset order.

Accordingly, an embodiment of the present disclosure may be implemented as a method implemented in a computer or may be implemented as a non-transitory computer-readable medium in which a computer-executable instruction has been stored. In an embodiment, when executed by a processor, a computer-readable instruction may perform a method according to at least one aspect of this writing.

The communication device 1320 may transmit or receive a wired signal or a wireless signal.

Furthermore, the method according to an embodiment of the present disclosure may be implemented in the form of a program instruction which may be executed through various computer means, and may be recorded on a computer-readable medium.

The computer-readable medium may include a program instruction, a data file, and a data structure alone or in combination. A program instruction recorded on the computer-readable medium may be specially designed and constructed for an embodiment of the present disclosure or may be known and available to those skilled in the computer software field. The computer-readable medium may include a hardware device configured to store and execute the program instruction. For example, the computer-readable medium may include magnetic media such as a hard disk, a floppy disk, and a magnetic tape, optical media such as CD-ROM and a DVD, magneto-optical media such as a floptical disk, ROM, RAM, and flash memory. The program instruction may include not only a machine code produced by a compiler, but a high-level language code capable of being executed by a computer through an interpreter.

The embodiments of the present disclosure have been described in detail, but the scope of rights of the present disclosure is not limited thereto. A variety of modifications and changes made by those skilled in the art using the basic concept of the present disclosure defined in the appended claims are also included in the scope of rights of the present disclosure.

What is claimed is:

1. An apparatus for controlling traffic lights, comprising:

a traffic signal display controller configured to transmit a pattern control command comprising information related to remaining time of a current traffic signal; and traffic lights configured to display information on a traffic signal by receiving the pattern control command, wherein the traffic signal display controller transmits the pattern control command for a cycle related to a turn-on and turn-off of an LED device corresponding to a specific signal based on the remaining time, and wherein the traffic signal display controller controls the LED device to display information on the remaining time by adjusting the cycle related to the turn-on and turn-off of the LED device that flickers within a preset time interval.

2. The apparatus of claim 1, wherein the traffic signal display controller transmits the pattern control command for the cycle related to the turn-on and turn-off of the LED device by considering results of grouping of the remaining times.

3. The apparatus of claim 1, wherein the traffic signal display controller transmits the pattern control command for an order in which an LED device corresponding to a specific signal is turned on based on the remaining time.

4. The apparatus of claim 3, wherein the traffic signal display controller controls the LED device to display information on the remaining time by adjusting a time interval for an order in which the LED device is turned on.

5. The apparatus of claim 3, wherein the traffic signal display controller controls the LED device to display information on the remaining time by differently adjusting a shape according to an order in which the LED device is turned on.

6. A traffic control method based on control of traffic lights, which is performed by a system for controlling traffic lights, the traffic control method comprising steps of:

(a) displaying a pattern comprising information related to a remaining display time for a current traffic signal of traffic lights;

(b) identifying the remaining display time by recognizing the displayed pattern; and (c) determining a driving behavior based on results of the identification of the remaining display time, wherein the step (a) comprises displaying the pattern so that a turn-on and turn-off of the traffic lights are repeated in a cycle that is not recognized by a naked eye of a person based on the remaining display time, and wherein the step (a) comprises displaying the pattern by differently adjusting a flickering cycle of the traffic lights within a preset time interval.

7. The traffic control method of claim 6, wherein the step (a) comprises displaying the pattern in a preset flickering cycle based on a group comprising the remaining display time.

8. The traffic control method of claim 6, wherein the step (a) comprises displaying the pattern by adjusting an order in which a plurality of LED devices corresponding to the current traffic signal is turned on.

9. The traffic control method of claim 8, wherein the step (a) comprises displaying the pattern by adjusting a time interval at which the plurality of LED devices is turned on.

10. The traffic control method of claim 8, wherein the step (a) comprises displaying the pattern in a shape according to a time flow that appears as the plurality of LED devices is turned on.

11. The traffic control method of claim 6, wherein the step (b) comprises:

photographing a traffic light area by using a camera mounted on a vehicle or a mobile terminal within the vehicle, and recognizing the pattern.

12. The traffic control method of claim 6, wherein the step (c) comprises issuing decision making on whether to pass through an intersection.

13. A system for controlling traffic lights, comprising:

an input interface device configured to receive a control command related to a signal display of traffic lights;

memory in which a program that controls a light emission of an LED device in response to a control command is stored; and a processor configured to execute the program, wherein the processor controls the light emission of the LED device in response to the control command, but controls the light emission of the LED device based on a pattern comprising information on a remaining time of a current traffic signal, wherein the processor controls a cycle related to a turn-on and turn-off of the LED device corresponding to a specific signal based on the remaining time, and wherein the processor controls the LED device to display information on the remaining time by adjusting the cycle related to the turn-on and turn-off of the LED device that flickers within a preset time interval.

14. The system of claim 13, wherein the processor controls a flickering cycle of the LED device disposed in a traffic light area corresponding to a specific signal.

15. The system of claim 13, wherein the processor controls an order in which the LED device disposed in the traffic light area corresponding to the specific signal is turned on based on a preset order.

* * * * *